United States Patent
Chaineux et al.

(10) Patent No.: US 8,061,122 B2
(45) Date of Patent: Nov. 22, 2011

(54) DEVICE FOR REMOVING NITROGEN OXIDES FROM INTERNAL COMBUSTION ENGINE WASTE GAS AND METHOD FOR DOSING AN AGGREGATE OF INTERNAL COMBUSTION ENGINE WASTE GAS

(75) Inventors: Marc Chaineux, Stuttgart (DE); Bernd Christner, Huelben (DE); Nicholas Fekete, Stuttgart (DE); Berthold Keppeler, Owen (DE); Markus Paule, Korb (DE)

(73) Assignee: Daimler AG, Stuttgart (DE)

( * ) Notice: Subject to any disclaimer, the term of this patent is extended or adjusted under 35 U.S.C. 154(b) by 873 days.

(21) Appl. No.: 11/886,456

(22) PCT Filed: Mar. 14, 2006

(86) PCT No.: PCT/EP2006/002305
§ 371 (c)(1),
(2), (4) Date: May 2, 2008

(87) PCT Pub. No.: WO2006/097268
PCT Pub. Date: Sep. 21, 2006

(65) Prior Publication Data
US 2008/0216463 A1    Sep. 11, 2008

(30) Foreign Application Priority Data
Mar. 18, 2005 (DE) .......................... 10 2005 012 568

(51) Int. Cl.
*F01N 3/00* (2006.01)
*F01N 3/10* (2006.01)
(52) U.S. Cl. ................. 60/286; 60/274; 60/295; 60/301; 60/303

(58) Field of Classification Search ................ 60/273, 60/286, 295, 301, 303, 274, 277
See application file for complete search history.

(56) References Cited

U.S. PATENT DOCUMENTS

| | | | |
|---|---|---|---|
| 5,369,956 A * | 12/1994 | Daudel et al. ............... | 60/276 |
| 6,004,524 A | 12/1999 | Morsbach et al. | |
| 6,182,444 B1 | 2/2001 | Fulton et al. | |
| 6,269,633 B1 * | 8/2001 | van Nieuwstadt et al. ..... | 60/277 |
| 6,367,320 B1 * | 4/2002 | Kueper et al. ............. | 73/114.71 |

(Continued)

FOREIGN PATENT DOCUMENTS
DE    42 17 552 C1    8/1993
(Continued)

OTHER PUBLICATIONS
English translation of Chinese Office Action (Four (4) pages.
(Continued)

*Primary Examiner* — Thomas Denion
*Assistant Examiner* — Audrey K Bradley
(74) *Attorney, Agent, or Firm* — Crowell & Moring LLP

(57) ABSTRACT

In a device and a method for removing nitrogen oxides from the exhaust of an internal combustion engine which is operated predominantly with an excess of air, the internal combustion engine is assigned an exhaust system having a nitrogen oxide reduction catalytic converter which comprises two catalytic converter parts, whose reducing agent filling levels can be determined. Metering of a reducing-agent-containing additive into the exhaust gas of the internal combustion engine takes place as a function of the reducing agent filling level of the first catalytic converter part and/or of the second catalytic converter part.

10 Claims, 6 Drawing Sheets

U.S. PATENT DOCUMENTS

| | | |
|---|---|---|
| 6,993,900 B2 | 2/2006 | Upadhyay et al. |
| 2002/0182127 A1 | 12/2002 | Braun et al. |
| 2004/0074229 A1 | 4/2004 | Upadhyay et al. |
| 2006/0096277 A1* | 5/2006 | Surnilla et al. ............... 60/286 |

FOREIGN PATENT DOCUMENTS

| | | |
|---|---|---|
| DE | 100 22 981 A1 | 4/2001 |
| DE | 101 26 456 A1 | 12/2002 |
| DE | 103 47 131 A1 | 5/2004 |
| EP | 0 554 766 A1 | 8/1993 |
| EP | 1 132 585 A2 | 9/2001 |

OTHER PUBLICATIONS

International Search Report dated Jul. 17, 2006 (PCT/ISA/210) including PCT/ISA/220 and PCT/ISA/237 with English translation of relevant portion (thirteen (13) pages).

* cited by examiner

DEVICE FOR REMOVING NITROGEN OXIDES FROM INTERNAL COMBUSTION ENGINE WASTE GAS AND METHOD FOR DOSING AN AGGREGATE OF INTERNAL COMBUSTION ENGINE WASTE GAS

BACKGROUND AND SUMMARY OF THE INVENTION

This invention relates to a device for removing nitrogen oxides from the exhaust of an internal combustion engine which is operated predominantly with an excess of air, as well as to a method for dosing a reducing-agent-containing additive into an exhaust line of an internal combustion engine which is operated predominantly with an excess of air.

German document DE 101 26 456 A1 discloses a device and a method for removing nitrogen oxides from the exhaust gas of lean-operated internal combustion engines by means of an ammonia-containing reducing agent, in which a nitrogen oxide reduction catalytic converter is used which is split into at least two parts which are separate from one another. Provided at the outlet side of each catalytic converter part is a sensor provided which measures the ammonia slip of the respective catalytic converter part. Metering of the reducing agent takes place in a regulated fashion on the basis of the measured ammonia slip. This permits differentiated evaluation of the entire catalytic converter volume, and the nitrogen oxide conversion can be improved in comparison with an integral measurement of an equally-large catalytic converter volume. Disadvantageous, however, are the costs for the sensors. In addition, the ammonia slip is a variable which merely indirectly characterizes the catalytic converter state. In addition, slip-regulated reducing agent metering proves to be difficult if the ammonia slip is to be completely avoided.

It is therefore an object of the invention to specify a device and a method which, in a simple manner, permit a further improved nitrogen oxide reduction for an internal combustion engine which is operated predominantly with an excess of air.

This object is achieved by means of a device having the features claimed.

According to the invention, filling level determining means for determining a reducing agent filling level of reducing agent which is stored in the first catalytic converter part and/or in the second catalytic converter part are provided, and the metering quantity of the additive can be set as a function of the reducing agent filling level, determined by the filling level determining means, of the first catalytic converter part and/or of the second catalytic converter part. It is preferably possible to set a mass-related or volume-related dosing rate of the additive. The reducing agent filling level is a highly informative variable for the evaluation of the catalytic converter state, and definitively determines the nitrogen oxide conversion and the reducing agent slip. The determination of the reducing agent filling level in the first catalytic converter part and/or in the second catalytic converter part permits a differentiated evaluation of the catalytic converter state, which makes it possible to optimally set the catalytic converter parts individually with regard to the nitrogen oxide conversion and the reducing agent slip. An optimization of nitrogen oxide conversion and reducing agent slip is consequently permitted overall.

Primarily considered as an additive for the exhaust gas is a substance containing ammonia or a substance suitable for the separation of ammonia such as urea, ammonium carbamate or the like. The additive can be metered to the exhaust gas in pure form or as an aqueous solution and/or as an aerosol-like mist at a metering point which is arranged in the exhaust line upstream of the first catalytic converter part. The metering point is preferably formed as a dosing valve with one or more nozzle openings. The nitrogen oxide reduction catalytic converter is preferably embodied as a classic SCR catalytic converter, based on tungsten oxide or vanadium pentoxide, or as a zeolitic catalytic converter. It is known that these catalytic converter types can store considerable quantities of ammonia, which acts as a reaction partner for a reduction of nitrogen oxides which are supplied with the exhaust gas. In this context, a reducing agent filling level is to be understood as the quantity of reducing agent stored in the catalytic converter bed. A relative variable is preferably used as a reducing agent filling level, which relative variable specifies the stored reducing agent quantity in relation to the maximum reducing agent quantity which can be stored under the present conditions.

The filling level determining means can comprise a sensor which is arranged in the catalytic converter bed, is sensitive to the reducing agent and is capable of measuring the stored reducing agent quantity. It is however preferable to determine the reducing agent filling level by calculation, so that it is possible to dispense with a filling level sensor of this type. The filling level determining means are therefore preferably designed as an electronic unit which can access stored data, preferably in the form of characteristic curves, characteristic diagrams and programs. A model-based calculative determination of the reducing agent filling level in the first and/or in the second catalytic converter part takes place on the basis of the data and additional input signals relating to definitive state variables of the nitrogen oxide reduction catalytic converter and of the exhaust gas, and also operating data of the internal combustion engine such as temperature, oxygen content of the exhaust gas, exhaust gas mass flow rate, internal combustion engine load and speed. Here, it is advantageous if the filling level determining means can communicate with an electronic internal combustion engine controller which is usually provided in any case, so that it is possible to access all operation-relevant variables. The filling level determining means can therefore also physically be an integral constituent part of the electronic internal combustion engine controller. The filling level determining means can however likewise be formed as a constituent part of the dosing unit.

Within the context of the invention, a dosing unit is to be understood as a control unit which carries out the setting of the metering or a dosing of the additive on the basis of the present information relating to the reducing agent filling level of the first and/or of the second catalytic converter part. Here, in order to set the metering quantity, the dosing unit controls corresponding actuating elements such as pumps, valves and the like. The metering unit is preferably embodied as a regulator which can adjust the reducing agent filling level of the first and/or of the second catalytic converter part. In this context, the reducing agent filling levels as initial variables, which the filling level determining means can generate, constitute regulating variables which can be adjusted to predefinable values on the basis of the additive metering quantity as an actuating variable. Here, metering quantity is preferably to be understood as the quantity of additive metered to the exhaust gas per unit time, with a dosing rate being generated here by averaging over a more or less extended time interval, so that one and the same dosing rate can be obtained both by means of pulsed on-off switching as well as by means of a variable adjustment within a continuous value range or by setting a technically predefined metering quantity within a certain timespan.

It is preferable to provide a separate regulating circuit for each catalytic converter part, so that the reducing agent filling levels of the first and of the second catalytic converter parts can be adjusted separately. It is particularly preferable to predefine reciprocal cross-relationships for the reducing agent filling levels, so that during the adjustment of the reducing agent filling level of one catalytic converter part, that of the second catalytic converter part is taken into account. It is particularly advantageous in this connection that merely a single metering point upstream of the first catalytic converter part is required in order to realize the invention.

As regards the catalytic converter parts, these can be constituent parts of a single-piece catalytic converter which can be considered as being split. In one embodiment of the invention, the first and the second catalytic converter parts are arranged spatially separate from one another. Here, it can be advantageous to arrange the catalytic converter parts comparatively far apart in the exhaust line, so that there is a comparatively large natural temperature drop of typically 50° C. or more between them in the case of a heated first catalytic converter part. The strong temperature dependency of the reducing agent storage capacity can be utilized in this way. This effect can be utilized particularly effectively by means of different catalytic converter materials for the first and second catalytic converter parts. Here, it is particularly advantageous if, in a further embodiment of the invention, the first catalytic converter part has a larger volume than the second catalytic converter part. As a result of the temperature drop along the exhaust gas path, the second catalytic converter part usually has a lower temperature than the first catalytic converter part. Consequently, for approximately equally high reducing agent filling levels, the second catalytic converter part can be designed to be smaller than the first catalytic converter part.

In a further embodiment of the invention, the reducing agent filling level of a respective catalytic converter part can be determined by means of summing and integration with respect to time of at least a conversion rate of reducing agent which is converted in the respective catalytic converter part, a desorption rate of reducing agent which is desorbed by the respective catalytic converter part and a supply rate of reducing agent which is supplied to the respective catalytic converter part with the exhaust gas. This permits a continuous determination of the present reducing agent filling level by means of a continuously carried out balancing of the variables which influence the filling level. In order to further improve the accuracy of the filling level determination, it is additionally possible to incorporate further factors in the balancing. It is additionally possible to incorporate reducing agent losses as a result of side reactions such as for example a direct oxidation of reducing agent. The influence of side reactions can also be contained in the conversion rate of the reducing agent.

In a further embodiment of the invention, a characteristic diagram set is provided for the conversion rate and for the desorption rate, which characteristic diagram set can be accessed by the filling level determining means during the determination of the reducing agent filling level. Here, the characteristic diagrams, or characteristic curves, expediently contain previously determined data for the respective catalytic converter. If further influential factors, such as for example a loss rate as a result of direct oxidation, are incorporated in addition to the conversion rate and the desorption rate, then separate characteristic diagrams which the filling level determining means can access can also be provided for the further influential factors. Losses as a result of side reactions can also be contained and incorporated in the characteristic diagram for the conversion rate.

In a further embodiment of the invention, for the reducing agent filling level of the first catalytic converter part, a first range with a first lower threshold value and a first upper threshold value can be predefined, and for the reducing agent filling level of the second catalytic converter part, a second range with a second lower threshold value and a second upper threshold value can be predefined. The dosing unit interacts with the filling level determining means in such a way as to permit an adjustment of the reducing agent filling level of the first catalytic converter part and/or of the second catalytic converter part into the respective range. The ranges for the reducing agent filling level are expediently predefined in advance in such a way as to generate an optimum nitrogen oxide conversion with a simultaneously minimal or negligible reducing agent slip. The ranges can be determined by means of suitably preliminary tests. The ranges for the reducing agent filling level can be different or identical for the first and the second catalytic converter parts.

In a further embodiment of the invention, for the nitrogen oxide reduction catalytic converter, an aging factor can be determined, and the first and/or second range for the reducing agent filling level can be predefined as a function of the aging factor. In this way, the ranges into which the reducing agent filling level is adjusted are adapted to the properties of the catalytic converter which vary in the course of time. Catalytic converter aging which occurs in the course of time can therefore be compensated, so that a high level of efficiency of the exhaust gas purification is ensured over long operating periods. If the first catalytic converter part is exposed to a higher temperature loading, it is advantageously possible by adapting the ranges to compensate the more sharply decreasing effectiveness of the first catalytic converter part. The separate consideration of different catalytic converter parts has an advantageous effect in this way. It can be provided to incorporate only aging caused by temperature loading. In this case, a weighted residence time at the respective temperature is expediently incorporated for determining the aging factor.

In a further embodiment of the invention, a first characteristic diagram set which is adapted for an unaged nitrogen oxide reduction catalytic converter and a second characteristic diagram set which is adapted for a definedly aged nitrogen oxide reduction catalytic converter are provided, with the first characteristic diagram set being assigned a first aging factor and the second characteristic diagram set being assigned a second aging factor. It is possible for the filling level determining means, during the determination of the reducing agent filling level, to carry out an interpolation between the data of the first characteristic diagram set and the second characteristic diagram set as a function of the present aging factor. This permits an appropriate incorporation of the present aging state of the first and/or second catalytic converter parts/part in a simple manner while avoiding an increased memory space requirement or processing expenditure. The aging factor is preferably defined between zero and one or 100%, with 100% aging constituting the maximum permissible aging, and the characteristic diagram sets corresponding to the aging states.

In a further embodiment of the invention, an exhaust gas sensor which is sensitive to nitrogen oxide and/or the reducing agent is arranged in the exhaust line downstream of the first catalytic converter part and/or of the second catalytic converter part. The exhaust gas sensor preferably serves for an alignment of the calculations carried out by the filling level determining means or for an alignment of the calculation model. For this purpose, it is possible to carry out a comparison between a calculated and a sensor-measured reducing agent desorption or nitrogen oxide concentration. This preferably takes place at predefinable or predefined operating points of the internal combustion engine or in a defined state of the catalytic converter, for example at every start of the internal combustion engine or before the beginning of a dosing.

In the method according to the invention, a reducing agent filling level of the first catalytic converter part and of the second catalytic converter part is determined and, as a function of the reducing agent filling level of the first catalytic converter part and/or of the second catalytic converter part, the reducing agent filling level of the first catalytic converter part or the reducing agent filling level of the second catalytic converter part is selected as a regulating variable for the regulation of the metering of the additive. By means of the determination, which takes place preferably in parallel, of the reducing agent filling levels both of the first and the second catalytic converter parts, the regulation of the metering can take place such that both catalytic converter parts in each case have predominantly their optimum reducing agent filling level, which is expediently adapted to the nitrogen oxide mass flow rates flowing in. This can be obtained by having the regulation of the additive metering oriented alternatively to the reducing agent filling level of the first or of the second catalytic converter part. Depending on the requirements, a switch is made between the reducing agent filling level of the first or of the second catalytic converter part as the present regulating variable for the metering. Here, the variables of the reducing agent filling levels are the definitive switching criteria. These can be flexibly predefinable or fixedly predefined. It is possible in this way to obtain overall an optimum nitrogen oxide conversion with at the same time negligible reducing agent slip.

In one embodiment of the method, the reducing agent filling level of a respective catalytic converter part is determined by means of summing and integration with respect to time of at least a conversion rate of reducing agent which is converted in the respective catalytic converter part, a desorption rate of reducing agent which is desorbed by the respective catalytic converter part and a supply rate of reducing agent which is supplied to the respective catalytic converter part with the exhaust gas. The conversion rate and desorption rate are expediently extracted from characteristic diagrams which are available for the respective operating state of the internal combustion engine or of a catalytic converter part. By means of the summing and integration of the variables which determine the respective filling level, the filling level can be determined continuously in a reliable fashion.

In a further embodiment of the method, the conversion of reducing agent, which is stored in the respective catalytic converter part, with nitrogen oxide and oxygen contained in the exhaust gas, is incorporated in the determination of the conversion rate. Particularly reliable determination of the present reducing agent conversion rate is permitted as a result of the additionally incorporated direct oxidation of the stored reducing agent with the oxygen present in the exhaust gas.

In a further embodiment of the method, the desorption rate of the first catalytic converter part is incorporated in the determination of the supply rate for the second catalytic converter part. This permits particularly reliable determination of the reducing agent filling level of the second catalytic converter part, so that the effectiveness or conversion rate can likewise be determined very reliably.

In a further embodiment of the method, for the reducing agent filling level of the first catalytic converter part, a first range with a first lower threshold value and a first upper threshold value is predefined, and the reducing agent filling level of the first catalytic converter part is selected as a regulating variable for the regulation of the metering of the additive if the reducing agent filling level of the first catalytic converter part lies below the first upper threshold value. With this approach, a target band for the reducing agent filling level of the first catalytic converter part is predefined. As long as the target band is not exceeded, the nitrogen oxide conversion rate can be further increased in the first catalytic converter part by means of further storage of reducing agent, without an impermissibly high degree of reducing agent slip occurring. If, therefore, in this case the reducing agent filling level of the first catalytic converter part is selected as a regulating variable for the metering, then the reducing agent filling level of the first catalytic converter part can be adjusted to its preferred value or into its preferred value range.

In a further embodiment of the method, for the reducing agent filling level of the first catalytic converter part, an upper limit value which lies above the first upper threshold value is predefined, and the reducing agent filling level of the second catalytic converter part is selected as a regulating variable for the regulation of the metering of the additive if the reducing agent filling level of the first catalytic converter part lies between the first upper threshold value and the upper limit value. With this approach, a switch is made to the reducing agent filling level of the second catalytic converter part as a regulating variable if the preferred target band for the reducing agent filling level of the first catalytic converter part is exceeded. Under these conditions, on the one hand, a sufficient nitrogen oxide conversion in the first catalytic converter part is permitted, and on the other hand, an appropriate reducing agent slip occurs, which is utilized for filling the reducing agent filling level of the second catalytic converter part. If, therefore, in this case the reducing agent filling level of the second catalytic converter part is selected as a regulating variable for the metering, then the reducing agent filling level of the second catalytic converter part can also be adjusted to its preferred value or into its preferred value range. At the same time, the reducing agent filling level of the first catalytic converter part is measured again in order to be able to react correspondingly, for example in the event of a further sharp rise.

In a further embodiment of the method, for the nitrogen oxide reduction catalytic converter, an aging factor which characterizes a temperature loading of the nitrogen oxide reduction catalytic converter is determined. This advantageously permits an adaptation of the preferred reducing agent filling levels of the first and/or of the second catalytic converter part to its respective aging state. Here, the temperature loading and the corresponding aging factor are preferably determined separately for the first and the second catalytic converter part.

In a further embodiment of the method, the first range and/or the upper limit value for the reducing agent filling level of the first catalytic converter part and/or the second range for the reducing agent filling level of the second catalytic converter part are therefore predefined as a function of the aging factor. It is therefore possible to react to different levels of aging of the catalytic converter parts.

Advantageous embodiments of the invention are illustrated in the drawings and are described below. Here, the features stated above and the features yet to be explained below can be used not only in the feature combination specified in each case but also in other combinations or individually without departing from the scope of the present invention.

DETAILED DESCRIPTION OF THE INVENTION

Figure 1:
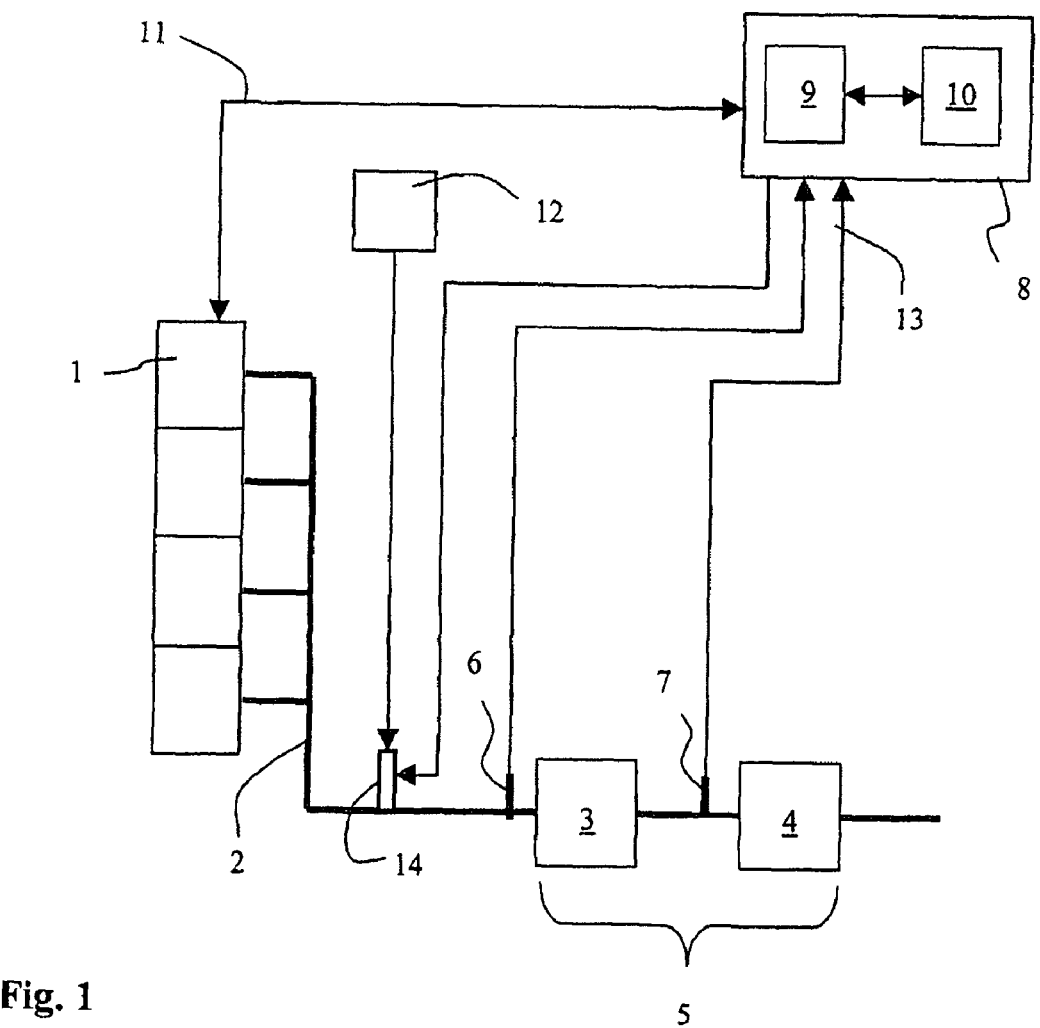
FIG. 1 shows a schematic block diagram of an internal combustion engine with an associated exhaust system.

FIG. 1 shows, by way of example, a schematic block diagram of an internal combustion engine 1 with associated exhaust gas purification system. The internal combustion engine 1 is preferably embodied as an air-compressing internal combustion engine, referred to in simplified fashion below as a diesel engine. The exhaust gas discharged by the diesel engine 1 is received by an exhaust line 2 and flows through the exhaust gas catalytic converter 5, which comprises the catalytic converter parts 3 and 4 which are arranged spaced apart from one another here. Arranged at the inlet side of the catalytic converter parts 3, 4 are temperature sensors 6, 7 for measuring the exhaust gas inlet temperatures of the exhaust gas flowing into the respective catalytic converter part 3, 4. Arranged in the exhaust line 2 upstream of the first temperature sensor 6 is a dosing valve 14 for dispensing an additive into the exhaust gas. The supply of additive to the dosing valve 14 takes place from a tank 12. Without restricting the generality, it is assumed in the following that the additive is an aqueous urea solution. In the hot exhaust gas, the reducing agent ammonia ($NH_3$) is released as a result of thermolysis and/or hydrolysis, which ammonia acts selectively with regard to the reduction of the nitrogen oxides contained in the exhaust gas. Accordingly, the catalytic converter 5 is embodied as a classic SCR catalytic converter based on $V_2O_5/WO_3$ or of zeolitic design.

The temperature sensors 6, 7 and the dosing valve 14 are connected by means of control or signal lines 13 to a central control unit 8. The control unit 8 is also connected by means of a further line 11 to the diesel engine 1. By means of the line 11, the control unit 8 obtains information regarding the operating state variables of the diesel engine 1. This can be information regarding the output torque or speed. The control unit 8 preferably comprises a processor and a memory unit and also an input-output unit which is not illustrated in detail. In this way, the control unit 8 is capable of carrying out complex signal processing processes and measuring and controlling or regulating the operation of the diesel engine 1. Characteristic diagrams required for this purpose are preferably stored in the control unit, with adaptive adaptation of the characteristic diagrams also being possible. The characteristic diagrams relate primarily to the definitive state variables of the exhaust gas, such as the mass flow rate, untreated emissions, and temperature, as a function of the operating state variables of the diesel engine 1 such as load, speed, air ratio etc. Characteristic diagrams are additionally provided for definitive state variables of the catalytic converter 5, such as nitrogen oxide conversion, ammonia storage capacity and the like.

For regulated actuation of the dosing valve 14, and for setting a metering quantity of the urea solution, a dosing unit 9 is provided which, here, by way of example, is a constituent part of the control unit 8, but can likewise be formed as a separate unit. The same applies to a filling level determining unit 10 which serves primarily for determining the ammonia quantities stored in the catalytic converter parts 3, 4, as will be discussed in more detail further below.

It is provided that the system illustrated in FIG. 1 has or can have further components which are not shown here for clarity. For the diesel engine 1, reference can be made here by way of example to turbocharging units, exhaust gas recirculation units or fuel injection devices etc. Further components such as for example an additional oxidation catalytic converter, a particulate filter, exhaust gas sensors and the like can be contained in the exhaust line 2.

Various characteristic variables of a typical SCR catalytic converter are explained below with reference to FIG. 2 to FIG. 4. Here, FIG. 2 illustrates a diagram for explaining the ammonia storage capacity.

Figure 2:
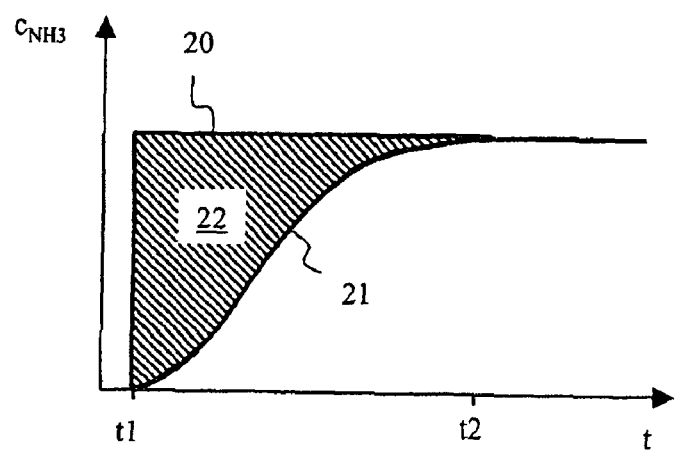
FIG. 2 shows a diagram illustrating the reducing agent storage capacity of a nitrogen oxide reduction catalytic converter.

The diagram of FIG. 2 illustrates a typical time profile $c_{NH3}(t)$ of ammonia concentration $c_{NH3}$ in the event of the SCR catalytic converter being acted on with ammonia. Here, it is assumed that an SCR catalytic converter which is free of stored ammonia is acted on under isothermic conditions at the time t1 with an exhaust gas inlet flow of predefined and time-invariant magnitude and ammonia inlet concentration, as is reflected by the track 20. Corresponding to its ammonia storage capacity, in the time range between t1 and t2, the SCR catalytic converter receives ammonia to a decreasing degree with time. Accordingly, the $NH_3$ concentration in the exhaust gas flow which leaves the SCR catalytic converter remains behind the inlet concentration, as is reflected by the track 21. At the time t2, the SCR catalytic converter is saturated, as a result of which it can store no more ammonia, and the track 21 merges into the track 20. The ammonia filling level has then reached the maximum value of 100%. Here, the ammonia quantity which is stored by the SCR catalytic converter, which constitutes the ammonia storage capacity under the corresponding conditions, is represented by the size of the area 22 between the two tracks 20, 21.

Figure 3:
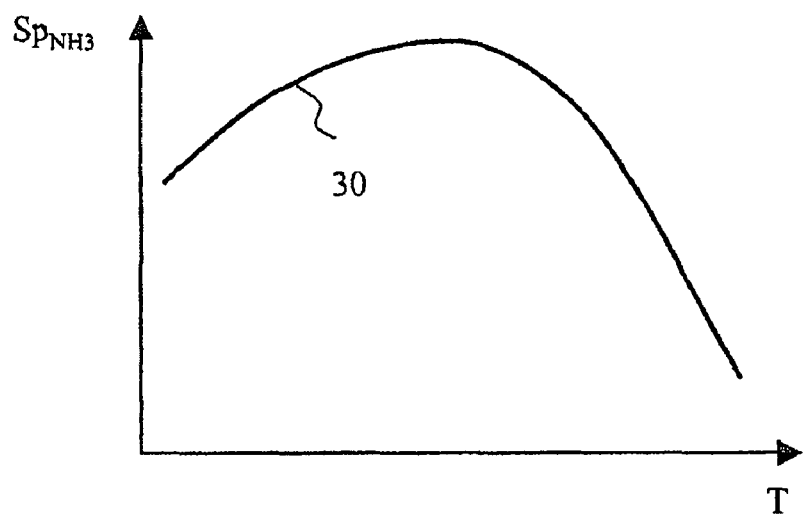
FIG. 3 shows a diagram illustrating the temperature dependency of the reducing agent storage capacity.

The ammonia storage capacity is primarily temperature-dependent, as is reflected by the diagram illustrated in FIG. 3. Here, the track 30 represents a typical profile of the temperature-dependent ammonia storage capacity $Sp_{NH3}(T)$. As can be seen from the diagram of FIG. 3, the ammonia storage capacity $Sp_{NH3}(T)$ is comparatively large at low temperatures T and decreases at high temperatures T, for example above 300° C. In addition, there is a dependency on gas throughput, which is not illustrated in any more detail.

In this connection, it is assumed below that the ammonia filling level of the SCR catalytic converter specifies the stored ammonia quantity in relation to the maximum ammonia quantity which can be stored under the respective conditions, according to the illustrated relationships.

An important aspect in connection with the properties of a typical SCR catalytic converter relates to the dependency of the nitrogen oxide conversion on the ammonia filling level. The dependency is illustrated schematically in FIG. 4 by means of the track 40. In comparison thereto, the track 41 reflects the dependency of the ammonia slip $S_{NH3}$ on the ammonia filling state. As can be seen, with increasing filling level F, the nitrogen oxide conversion rate $U_{NOx}(F)$ increases continuously with a flattening gradient up to a maximum value which is determined substantially by the gas throughput and by the temperature. This means that, above a certain value for the ammonia filling level F, the nitrogen oxide conversion $U_{NOx}$ can no longer be increased by means of a further storage of ammonia in the catalytic converter. In fact, the ammonia slip $S_{NH3}$ is increased, as is illustrated by the track 41. The incorporation of these facts is of particular significance when setting an optimum value for the respective conditions for the ammonia filling state F. In this connection, the possibility provided according to the invention of being able to separately set the ammonia filling level of two SCR catalytic converters which are arranged in series is a significant advantage. For example, it is possible to set a comparatively high ammonia filling level for the first catalytic converter part, with it being possible for the ammonia slip which occurs here to be intercepted by the second catalytic converter part which is arranged downstream.

Figure 4:
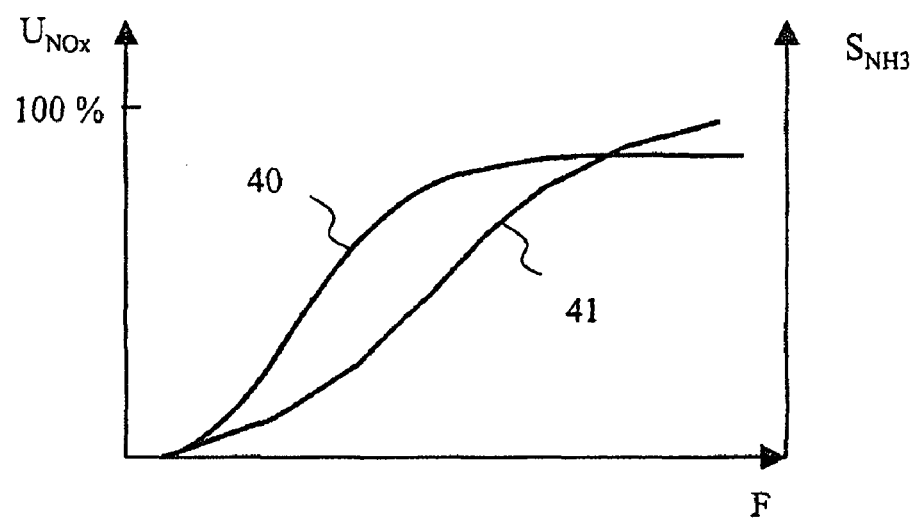
FIG. 4 shows a diagram illustrating the dependency of nitrogen oxide conversion and reducing agent slip on the reducing agent filling level of a nitrogen oxide reduction catalytic converter.

The dependencies schematically illustrated in FIGS. 2 to 4 are expediently determined in advance, and stored as characteristic curves or characteristic diagrams, for the SCR catalytic converter which is to be used. These characteristic curves or characteristic diagrams can be accessed by the control unit 8, so that the state of the catalytic converter parts 3, 4 can be determined comprehensively for each operating state. Here, it is provided according to the invention to provide a characteristic diagram set for an unaged new state and a further characteristic diagram set for a defined aged state, preferably corresponding to a predefined limit age. It is particularly advantageous here for the unaged state to be assigned a first aging factor of for example zero and for the limit aging state to be assigned a second aging factor of for example one. During operation of the diesel engine 1, the present aging state of the catalytic converter parts 3, 4 is determined continuously and the present aging state is assigned a present aging factor AF which lies between zero and one. When accessing characteristic curve data, interpolation is then carried out preferably linearly between the data of the characteristic diagram sets for the new state and the limit aging state corresponding to the present aging factor AF.

Here, during the determination of the present aging factor AF, the following is preferably carried out. For the SCR catalytic converter which is to be used, a temperature damage characteristic curve, which incorporates the temperature influence which is predominantly definitive for the aging, is determined in advance.

Figure 5:
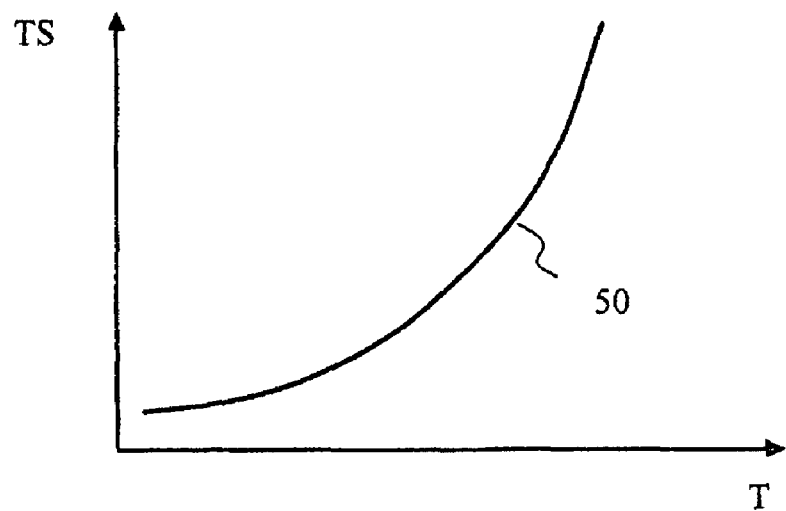
FIG. 5 shows a diagram illustrating catalytic converter aging as a result of the action of increased temperatures.

FIG. 5 illustrates a temperature damage characteristic curve of this type. The temperature damage TS typically has an approximately exponential dependency on the temperature T. During operation of the diesel engine 1, integration with respect to time of the temperature damage value TS (T) is carried out continuously corresponding to the determined catalytic converter temperature T and the stored characteristic curve illustrated in FIG. 5, according to the formula $$AF = \int TS(T)^* dt.$$

Here, the temperature damage TS (T) is scaled such that an aging factor AF of one is given for the limit damage. In this way, the temperature loading of the catalytic converter parts 3, 4 can be quantified and the ammonia filling level or the urea dosing can be set in a manner adapted to the aging state of the respective catalytic converter part 3, 4. In addition, a continuous diagnosis of the catalytic converter parts 3, 4 is made possible, so that for example a corresponding warning message can be output when the limit age is reached.

A preferred procedure for the determination and setting the ammonia filling level is explained in more detail below with reference to FIGS. 6 and 7.

Figure 6:
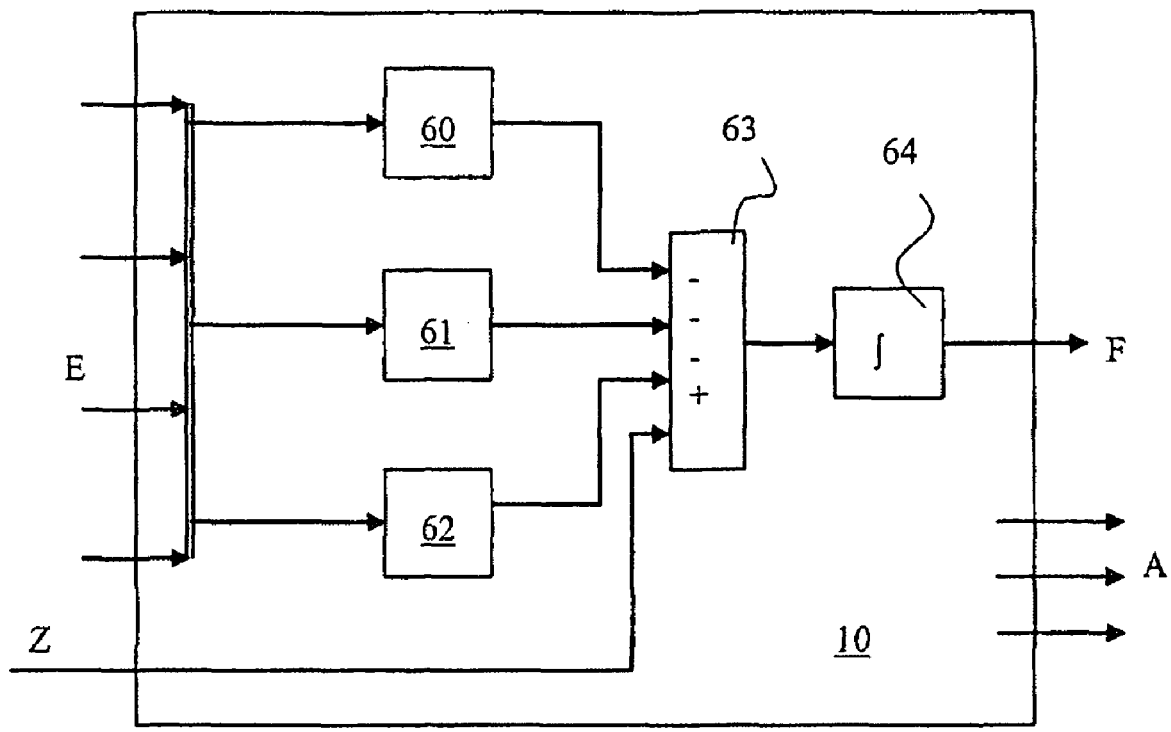
FIG. 6 is a schematic block diagram illustration of an advantageous embodiment of a filling level determining unit.

FIG. 6 illustrates an advantageous embodiment of the filling level determining unit 10 schematically in the form of a block diagram. Here, only those parts are illustrated which are used for determining the ammonia filling level of one of the catalytic converter parts 3, 4. For simplicity, the term 'catalytic converter' is used below. The filling level determining unit 10 receives input variables E which, in addition to the present aging factor AF, include exhaust gas state variables such as the exhaust gas temperature, the nitrogen oxide content and the exhaust gas mass flow rate. The filling level determining unit 10 has characteristic diagram sets 60, 61, 62 for the conversion with nitrogen oxides, the direct conversion with oxygen and the desorption rate of ammonia which is stored in the catalytic converter. Here, the definitive data are determined corresponding to the present input variables. The values for the conversion with nitrogen oxides, the direct conversion with oxygen and the desorption rate given by the ammonia slip $S_{NH3}$ are passed together with the ammonia supply rate Z to a summing junction 63 which sums the relevant variables according to their signs. This permits balancing for the variables which substantially determine the ammonia quantity which is stored in the catalytic converter. The summed value is passed to an integration element 64 whose output variable constitutes the present ammonia filling level F of the catalytic converter. In addition, further output variables A are determined from the present data. These are primarily variables relating to the nitrogen oxide content of the exhaust gas flowing out of the catalytic converter, the ammonia slip $S_{NH3}$ and the exhaust gas temperature which has if appropriate varied as a result of the reaction heat or as a result of heat losses. It is provided that the calculations are carried out separately for the catalytic converter parts 3, 4, with the desorption rate or the ammonia slip $S_{NH3}$ of the first catalytic converter part constituting the ammonia supply rate Z of the second catalytic converter part 4. The ammonia supply rate Z of the first catalytic converter part 3 is determined from the urea dosing rate which is dispensed by means of the dosing valve 14, with it being provided to incorporate losses as a result of wall absorption or wall deposition in the exhaust line 2, incomplete processing and the like.

From the determined ammonia filling level F for the first catalytic converter part 3 and/or for the second catalytic converter part 4, it is determined whether metering of urea solution should take place and the dosing rate is calculated. This is preferably carried out by means of the regulator of the dosing unit 9, to which the ammonia filling levels F can be passed as regulating variables. Here, the ammonia filling level F of the first catalytic converter part 3 or that of the second catalytic converter part 4 serves as a regulating variable depending on the magnitude of the ammonia filling levels F.

Figure 7A:
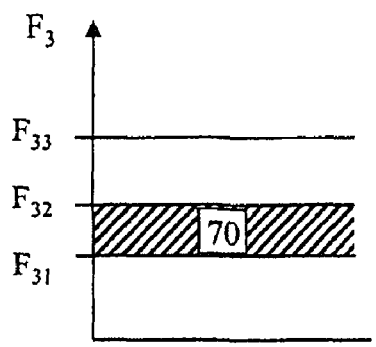
FIGS. 7a and 7b show diagrams illustrating predefinable values for reducing agent filling levels.
Figure 7B:
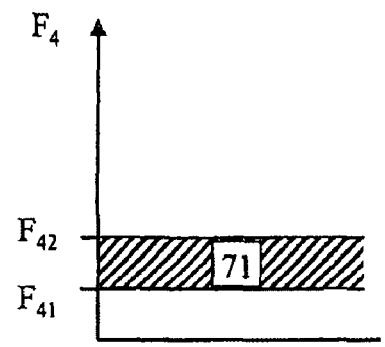

Specific values for ammonia filling levels are predefined for selection, as illustrated by the diagrams of FIGS. 7a and 7b.

In the diagrams of FIGS. 7a and 7b, filling levels $F_3$ and $F_4$ for the first catalytic converter part 3 and the second catalytic converter part 4 are plotted in each case on the ordinate. According to the invention, filling level ranges are predefined, into which the filling levels of the catalytic converter parts 3, 4 are adjusted. Here, for the first catalytic converter part 3, a first filling level range 70 with a first lower threshold value $F_{31}$ and a first upper threshold value $F_{32}$ is predefined. Similarly, for the second catalytic converter part 4, a second filling level range 71 with a second lower threshold value $F_{41}$ and a second upper threshold value $F_{42}$ is predefined. In addition, for the first catalytic converter part 3, an upper limit value $F_{33}$ which lies above the first upper threshold value $F_{32}$ is predefined. The filling level ranges 70, 71 for the catalytic converter parts 3, 4 can be predefined by identical threshold values, but said threshold values are preferably different and, for the second catalytic converter part 4, a second filling level range 71 is predefined whose second threshold values $F_{41}$, $F_{42}$ are lower than the first threshold values $F_{31}$, $F_{32}$ for the filling level range 70 of the first catalytic converter part 3. The threshold values $F_{31}$, $F_{32}$, $F_{41}$, $F_{42}$ are predefined as a function of the temperature of the respective catalytic converter parts 3, 4, wherein for the case that the temperature of the first catalytic converter part 3 is much higher than the temperature of the second catalytic converter part 4, the threshold values $F_{41}$, $F_{42}$ are preferably predefined to be higher than the threshold values $F_{31}$, $F_{32}$. The ranges 70, 71 are adapted with regard to their threshold values to the aging state as a function of the aging factor AF of a respective catalytic converter part 3, 4.

Figure 8A:
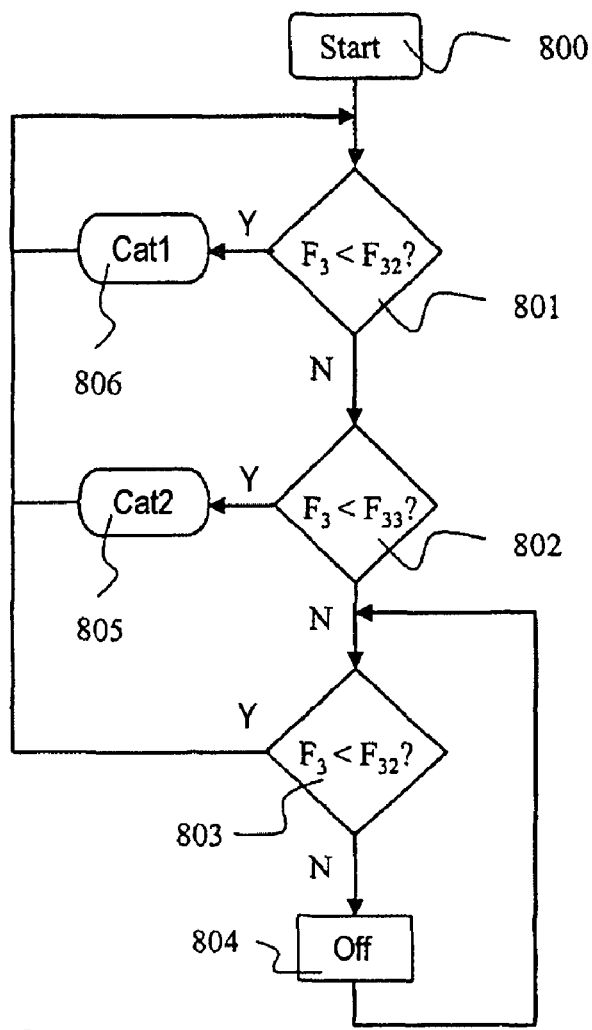
FIGS. 8a to 8c show flow diagrams for explaining the procedure during the further processing of the measured reducing agent filling levels.
Figure 8B:
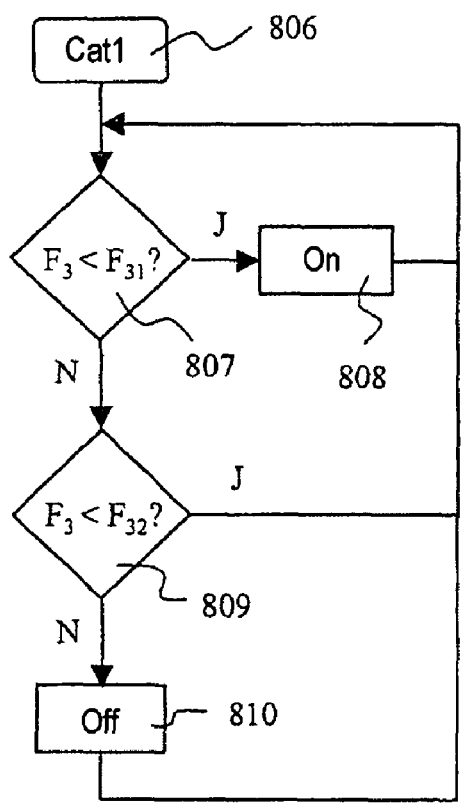
Figure 8C:
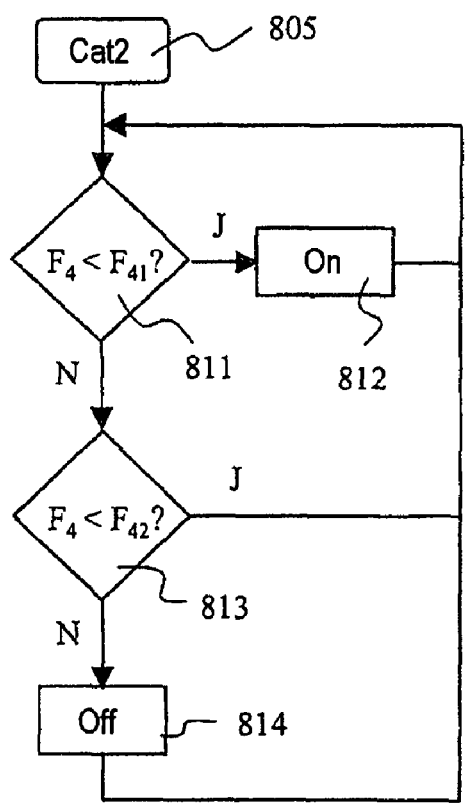

A setting or adjustment of the filling levels of the catalytic converter parts 3, 4 now preferably takes place according to the flow diagrams illustrated in FIGS. 8a to 8c, as a function of the in each case present values for the reducing agent filling level of a respective catalytic converter part 3, 4. Here, it is assumed below that simple on-off regulation of the urea metering takes place. Some other type of regulation, for example in the form of PID regulation, can of course likewise be provided. The routines illustrated in the flow diagrams are preferably executed in the dosing unit 9.

The flow diagram of FIG. 8a illustrates the process of a first query loop which is run through continuously in the normal state. The query loop starts after the detection of the operational readiness at least of the first catalytic converter part 3 in the block 800. The ammonia filling level $F_3$, which is determined by the filling level determining unit 10, of the first catalytic converter part 3 is queried in the query block 801. If the ammonia filling level $F_3$ lies below the first upper threshold value $F_{32}$, then a jump is made to block 806 (Cat1), and the filling level of the first catalytic converter part 3 is definitive for the dosing of the urea solution. The further procedure which then takes place is explained further below with the explanation of the second flow diagram illustrated in FIG. 8b.

If it is detected in the query block 801 that the ammonia filling level $F_3$ of the first catalytic converter part 3 lies above the first upper threshold value $F_{32}$ (N), then it is queried in the next query block 802 whether the upper limit value $F_{33}$ is undershot. If this is the case, then a jump is made to the block 805 (Cat2), and the filling level of the second catalytic converter part 4 is definitive for the dosing of the urea solution. The procedure which then takes place is explained below with the explanation of the third flow diagram illustrated in FIG. 8c.

If the query of the block 802 is answered with "no", then it is queried again in block 803 whether the filling level lies below the first upper threshold value $F_{32}$. This will initially not be the case, so that the block 804 is reached and the dosing of the urea solution is deactivated (dosing "off"). The first catalytic converter part 3 has therefore stored sufficient ammonia, with the filling level reducing with time as a result of losses due to the conversion with nitrogen oxides and/or oxygen and as a result of desorption. Here, if the filling level falls below the first upper threshold value $F_{32}$, then this is detected as a result of the returning jump back to the query block 803, and a jump is made back to the start of the query loop.

The second flow diagram illustrated in FIG. 8b shows the procedure when the filling level $F_3$ of the first catalytic converter part 3 is definitive for the urea dosing. Here, it is initially queried in block 807 whether the filling level $F_3$ lies below the first lower threshold value $F_{31}$. If this is the case, then the dosing of the urea solution is activated (block 808), and a jump is made back to the start of the query loop. In the other case, it is queried in block 809 whether the filling level $F_3$ lies below the first upper threshold value $F_{32}$. If this is the case, then a jump is made back to the start of the query loop without a change to the dosing state. If, in contrast, the first upper threshold value $F_{32}$ is exceeded (N), then the dosing of the urea solution is deactivated (block 810) and a jump is made back to the start of the query loop.

The third flow diagram illustrated in FIG. 8c shows the procedure when the filling level $F_4$ of the second catalytic converter part 4 is definitive for the urea dosing. Here, the procedure is entirely similar to the procedure explained in connection with the second flow diagram of FIG. 8b, for which reason no further explanation will be given here. Overall, it is obtained that, for both catalytic converter parts 3, 4 in this way the in each case preferred filling level range can be set. It is highlighted that, during the run-through of the query loops of FIGS. 8b and 8c, the query loop of FIG. 8a is constantly active, so that a change in the filling levels can be reacted to in a flexible fashion.

Figure 9:
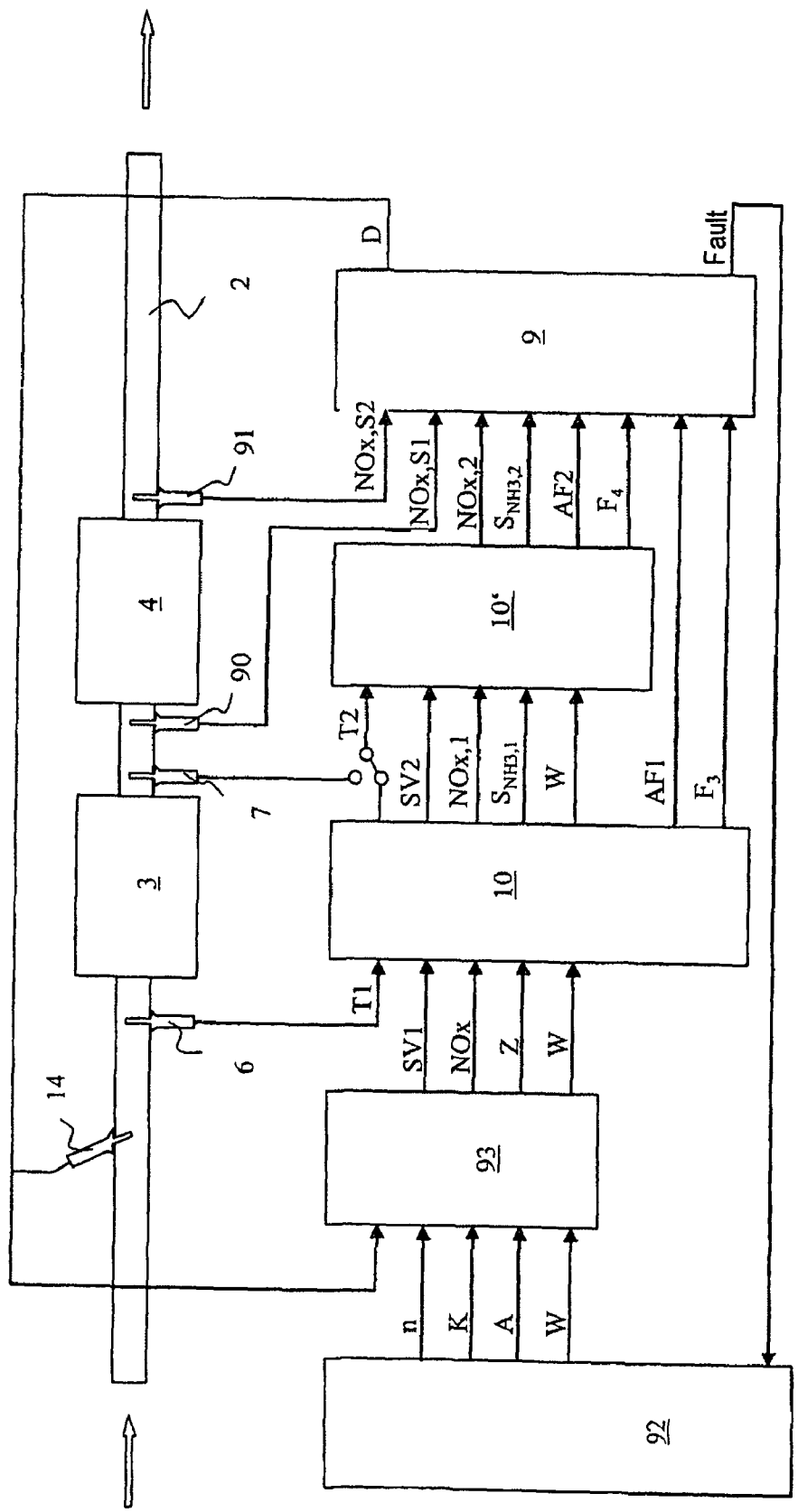
FIG. 9 shows a schematic overview of a preferred embodiment of the device according to the invention in a block diagram illustration.

FIG. 9 illustrates a block diagram of a preferred embodiment of a device according to the invention, with components and variables, where they correspond to those of FIGS. 1 to 8c, being provided with the same reference symbols.

In order to set a dosing rate D of the urea metering into the exhaust gas by means of the dosing valve 14, a first filling level determining unit 10 for determining the ammonia filling level $F_3$ of the first catalytic converter part 3, a second filling level determining unit 10' for determining the ammonia filling level $F_4$ of the second catalytic converter part 4 and a dosing unit 9 are provided. Their functions are substantially explained further above, so that merely special features are explained below.

In contrast to the device illustrated in FIG. 1, the device as per FIG. 9 has two exhaust gas sensors 90 and 91 which are additionally arranged in the exhaust line 2. The exhaust gas sensors 90, 91 are embodied here as nitrogen oxide sensors which provide the signals for the nitrogen oxide concentration NOx,S1 and NOx,S2 at the respective point. It is however also possible for at least one of the sensors 90, 91 to be embodied as an ammonia sensor. The data of said sensors 90, 91 serves in particular for the alignment of the calculation routines or for the adaptation of the stored characteristic diagrams and characteristic curves, so that at least one of the sensors 90, 91 can also be dispensed with if appropriate.

An engine control unit 92 transmits data relating to the present engine speed n, the present fuel injection quantity K and the present exhaust gas mass flow rate A in addition to further data W as input data to a signal processing and calculating unit 93. From said input data and from the present urea dosing rate D for the first catalytic converter part 3, the signal processing and calculating unit 93 calculates the present space velocity SV1, the present nitrogen oxide concentration NOx, the ammonia supply rate Z and further data W which are passed to the first filling level determining unit 10 as input data.

From the data and from the exhaust gas inlet temperature T1, the first filling level determining unit 10 calculates, for the first catalytic converter part 3 as described above, the filling level $F_3$, the aging factor AF1, the ammonia slip $S_{NH3,1}$, the nitrogen oxide starting concentration NOx,1 and the space velocity SV2. Together with the exhaust gas temperature T2 and further data W, these data are provided as input variables to the second filling level determining unit 10' and the dosing unit 9. As illustrated in FIG. 9, the second filling level determining unit 10' can receive the exhaust gas temperature T2, which is definitive for the second catalytic converter part 4, as a calculated value from the first filling level determining unit 10 or from the second temperature sensor 7 as a measured value. It is additionally possible to carry out a model alignment with the measurement values delivered by the second temperature sensor.

In a similar way, from the input data provided to it, the second filling level determining unit 10' calculates, for the second catalytic converter part 4 as described above, the filling level $F_4$, the aging factor AF2, the ammonia slip $S_{NH3,2}$ and the nitrogen oxide starting concentration NOx,2 and the space velocity SV2.

From the input data provided to it, the dosing unit 9 determines a urea dosing rate D which is suitable for setting the desired ammonia filling levels of the first and/or of the second catalytic converter part, and actuates the dosing valve 14 correspondingly. In addition, the dosing unit 9 can detect a malfunction for one of the catalytic converter parts 3, 4, of the temperature sensors 6, 7, of the exhaust gas sensors 90, 91 or of the urea dosing or of the dosing valve 14, and can output a corresponding fault message, by evaluating in particular the aging factors AF1, AF2 and the nitrogen oxide concentrations NOx,2, NOx,S1 and NOX,S2. In this way, an OBD (on board diagnosis) function can be performed by the dosing device or the central control unit 8.

The invention claimed is:

1. A device for removing nitrogen oxides from exhaust of an internal combustion engine operated predominantly with excess air, comprising:
an exhaust line,
a metering point, which is assigned to the exhaust line, for metering a reducing agent containing additive into exhaust gas,
a nitrogen oxide reduction catalytic converter, which is arranged in the exhaust line downstream of the metering point, for reduction of nitrogen oxides contained in the exhaust gas with the reducing agent, having a first catalytic converter part and a second catalytic converter part arranged downstream of the first catalytic converter part, the nitrogen oxide reduction catalytic converter being designed to store the reducing agent,
a dosing unit for setting a metering quantity for the additive metered to the exhaust gas via the metering point, and
filling level determining means for determining a reducing agent filling level of reducing agent which is stored in at least one of the first catalytic converter part and the second catalytic converter part,
wherein the metering quantity of the additive is set as a function of the reducing agent filling level, determined by the filling level determining means, of the at least one of the first catalytic converter part and the second catalytic converter part, and
wherein the reducing agent filling level of a respective catalytic converter part is determined by summing and integration with respect to time of at least a conversion rate of reducing agent which is converted in the respective catalytic converter part, a desorption rate of reducing agent which is desorbed by the respective catalytic converter part, and a supply rate of reducing agent which is supplied to the respective catalytic converter part with the exhaust gas.

2. The device as claimed in claim 1, wherein a characteristic diagram set is provided for the conversion rate and for the desorption rate, and wherein the characteristic diagram set is accessed by the filling level determining means during determination of the reducing agent filling level.

3. A device for removing nitrogen oxides from exhaust of an internal combustion engine operated predominantly with excess air, comprising:
an exhaust line,
a metering point, which is assigned to the exhaust line, for metering a reducing agent containing additive into exhaust gas,
a nitrogen oxide reduction catalytic converter, which is arranged in the exhaust line downstream of the metering point, for reduction of nitrogen oxides contained in the exhaust gas with the reducing agent, having a first catalytic converter part and a second catalytic converter part arranged downstream of the first catalytic converter part, the nitrogen oxide reduction catalytic converter being designed to store the reducing agent,
a dosing unit for setting a metering quantity for the additive metered to the exhaust gas via the metering point, and
filling level determining means for determining a reducing agent filling level of reducing agent which is stored in at least one of the first catalytic converter part and the second catalytic converter part,
wherein the metering quantity of the additive is set as a function of the reducing agent filling level, determined by the filling level determining means, of the at least one of the first catalytic converter part and the second catalytic converter part,
wherein, for the reducing agent filling level of the first catalytic converter part, a first range with a first lower threshold value and a first upper threshold value is predefined,
wherein, for the reducing agent filling level of the second catalytic converter part, a second range with a second lower threshold value and a second upper threshold value is predefined, and
wherein the dosing unit interacts with the filling level determining means in such a way as to permit an adjustment of the reducing agent filling level of at least one of the first catalytic converter part and the second catalytic converter part into the respective range.

4. The device as claimed in claim 3, wherein, for the nitrogen oxide reduction catalytic converter, an aging factor is determined, and wherein at least one of the first and second ranges for the reducing agent filling level is predefinable as a function of the aging factor.

5. The device as claimed in claim 4, wherein a first characteristic diagram set which is adapted for an unaged nitrogen oxide reduction catalytic converter and a second characteristic diagram set which is adapted for a definedly aged nitrogen oxide reduction catalytic converter are provided, wherein the first characteristic diagram set is assigned a first aging factor and the second characteristic diagram set is assigned a second aging factor, and wherein it is possible for the filling level determining means, during determination of the reducing agent filling level, to carry out an interpolation between the data of the first characteristic diagram set and the second characteristic diagram set as a function of the present aging factor.

6. A method for dosing a reducing agent containing additive into an exhaust line of an internal combustion engine, operated predominantly with an excess of air, having a metering point for metering the additive into exhaust gas, a nitrogen oxide reduction catalytic converter, which is arranged in the exhaust line downstream of the metering point, having a first catalytic converter part and a second catalytic converter part arranged downstream of the first catalytic converter part, and a dosing unit for regulating a metering quantity for the additive metered to the exhaust gas via the metering point, comprising:
- determining a reducing agent filling level of at least one of the first catalytic converter part and the second catalytic converter part, and
- selecting the reducing agent filling level of the first catalytic converter part or the reducing agent filling level of the second catalytic converter part as a regulating variable for regulation of metering of the additive as a function of the reducing agent filling level of at least one of the first catalytic converter part and the second catalytic converter part,
- wherein the reducing agent filling level of a respective catalytic converter part is determined by summing and integration with respect to time of at least a conversion rate of reducing agent which is converted in the respective catalytic converter part, a desorption rate of reducing agent which is desorbed by the respective catalytic converter part, and a supply rate of reducing agent which is supplied to the respective catalytic converter part with the exhaust gas.

7. The method as claimed in claim 6, wherein conversion of the reducing agent, which is stored in the respective catalytic converter part, with nitrogen oxide and oxygen contained in the exhaust gas is incorporated in the determination of the conversion rate.

8. The method as claimed in claim 7, wherein a desorption rate of the first catalytic converter part is incorporated in the determination of the supply rate for the second catalytic converter part.

9. A method for dosing a reducing agent containing additive into an exhaust line of an internal combustion engine, operated predominantly with an excess of air, having a metering point for metering the additive into exhaust gas, a nitrogen oxide reduction catalytic converter, which is arranged in the exhaust line downstream of the metering point, having a first catalytic converter part and a second catalytic converter part arranged downstream of the first catalytic converter part, and a dosing unit for regulating a metering quantity for the additive metered to the exhaust gas via the metering point, comprising:
- determining a reducing agent filling level of at least one of the first catalytic converter part and the second catalytic converter part, and
- selecting the reducing agent filling level of the first catalytic converter part or the reducing agent filling level of the second catalytic converter part as a regulating variable for regulation of metering of the additive as a function of the reducing agent filling level of at least one of the first catalytic converter part and the second catalytic converter part,
- wherein, for the reducing agent filling level of the first catalytic converter part, a first range with a first lower threshold value and a first upper threshold value is predefined,
- wherein the reducing agent filling level of the first catalytic converter part is selected as a regulating variable for regulation of the metering of the additive if the reducing agent filling level of the first catalytic converter part lies below the first upper threshold value,
- wherein, for the reducing agent filling level of the first catalytic converter part, an upper limit value which lies above the first upper threshold value is predefined, and
- wherein the reducing agent filling level of the second catalytic converter part is selected as a regulating variable for the regulation of the metering of the additive if the reducing agent filling level of the first catalytic converter part lies between the first upper threshold value and the upper limit value.

10. The method as claimed in claim 9, wherein at least one of the first range, the predefined upper limit value, and a second range for the reducing agent filling level of the second catalytic converter part is predefined as a function of an aging factor.

* * * * *